(12) United States Patent
Ahn et al.

(10) Patent No.: US 7,450,186 B2
(45) Date of Patent: Nov. 11, 2008

(54) LASER TELEVISION

(75) Inventors: Pil-Soo Ahn, Suwon-si (KR);
Serafimovich Pavel, Yongin-si (KR);
Jin-Ho Lee, Suwon-si (KR);
Yong-Kweun Mun, Yongin-si (KR);
Byoung-Ho Cheong, Goyang-si (KR)

(73) Assignee: Samsung Electronics Co., Ltd (KR)

( * ) Notice: Subject to any disclaimer, the term of this patent is extended or adjusted under 35 U.S.C. 154(b) by 568 days.

(21) Appl. No.: 11/131,852

(22) Filed: May 18, 2005

(65) Prior Publication Data

US 2006/0001780 A1    Jan. 5, 2006

(30) Foreign Application Priority Data

May 18, 2004    (KR)    ...................... 10-2004-0035035

(51) Int. Cl.
*H04N 5/74*    (2006.01)
(52) U.S. Cl. ...................................................... 348/758
(58) Field of Classification Search ................. 348/758, 348/760, 744, 750, 754, 756, 757, 725, 552; 359/201, 202
See application file for complete search history.

(56) References Cited

U.S. PATENT DOCUMENTS

| 3,507,984 | A | * | 4/1970 | Stavis .......................... 348/757 |
| 3,936,871 | A | * | 2/1976 | Mohon ......................... 348/197 |
| 4,003,080 | A | * | 1/1977 | Maiman et al. ............. 348/196 |
| 6,636,339 | B2 | * | 10/2003 | Lee ............................. 359/202 |
| 6,724,509 | B2 | * | 4/2004 | Lee ............................. 359/201 |

* cited by examiner

*Primary Examiner*—Paulos M Natnael
(74) *Attorney, Agent, or Firm*—The Farrell Law Firm, PC

(57) ABSTRACT

A laser television including a plurality of lasers for generating different wavelengths of interferential light; a scanner for displaying color images on a screen composed from the light; and a phase diffuser positioned between the lasers and the scanner for diffusing the light from the lasers according to the light's wavelength. The phase diffuser having a boundary surface, through which the light is outputted to the scanner. The boundary surface is slanted with a predetermined angle to regulate the range of diffraction of the light according to the wavelength.

6 Claims, 3 Drawing Sheets

LASER TELEVISION

PRIORITY

This application claims priority to an application entitled "Laser Television" filed with the Korean Intellectual Property Office on May 18, 2004 and assigned Serial No. 2004-35035, the contents of which are hereby incorporated by reference.

BACKGROUND OF THE INVENTION

1. Field of the Invention

The present invention relates to a laser television, and more particularly to a laser television having a means for controlling a speckle phenomenon caused by different wavelengths of light.

2. Description of the Related Art

In general, image regeneration apparatuses including projection and laser televisions have a plurality of lasers for generating interferential light of basic colors, e.g., red, green, and blue, so that color images can be displayed on a screen. In other words, the image regeneration apparatuses can display color images using a combination of different wavelengths of light.

The lasers generate different wavelengths of light, the high degree of interference of which causes irregular intensity distribution when images are displayed on screens.

The irregular intensity distribution on laser televisions' screens due to the high degree of interference of light is referred to as "speckle noise." Speckle noise may occur when the screens are not even or when fine dust exists in the propagation path of light.

In an effort to remove the speckle noise, it has been proposed to position ground glass in the propagation path of light and to vibrate the ground glass minutely, so that the speckle noise on the screens can be suppressed. However, when light passes through the ground glass, a large loss of intensity occurs.

As an alternative to the ground glass scenario, it is proposed to use a diffraction grating, which has a higher transmission coefficient for interferential light than the ground glass. The intensity loss for interferential light can then be decreased.

However, a means for removing speckle noise including a diffraction grating has a problem in that it must include a plurality of diffraction gratings, which have different grating cycles corresponding to different wavelengths of interferential light. This increases the manufacturing cost and makes it difficult to align optical axes.

SUMMARY OF THE INVENTION

Accordingly, the present invention has been made to solve the above-described problems occurring in the prior art, and an object of the present invention is to provide a diffraction grating for preventing the speckle noise of a laser television for generating images on a screen using different wavelengths of light.

To achieve this object, there is provided a laser television including a plurality of lasers for generating different wavelengths of interferential light; a scanner for displaying color images on a screen from the light; and a phase diffuser positioned between the lasers and the scanner for diffusing the light from the lasers according to the wavelength, the phase diffuser having a boundary surface, through which the light is outputted to the scanner, the surface boundary being slanted with a predetermined angle to regulate the range of diffraction of the light according to the wavelength.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

Figure 1:
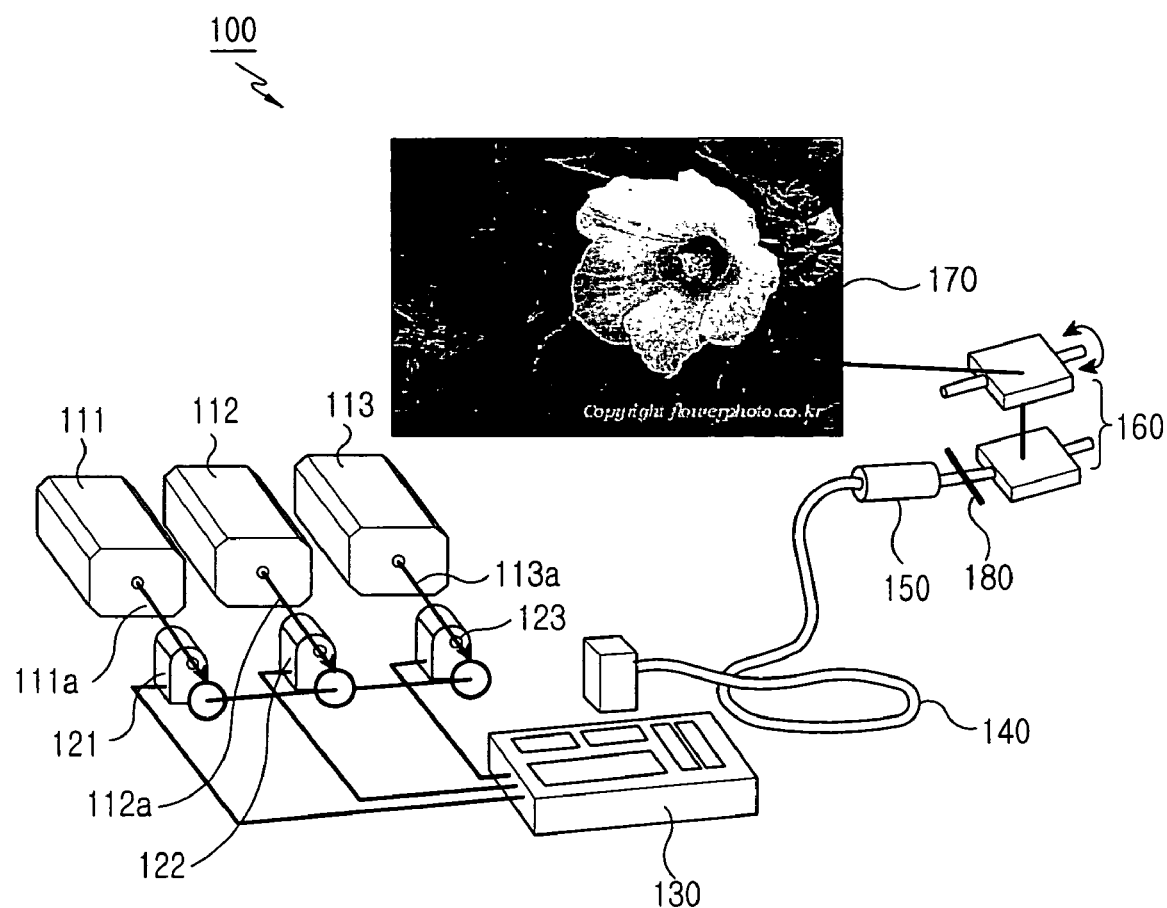
FIG. 1 is a diagram showing the construction of a laser television according to a first embodiment of the present invention.

FIG. 1 shows the construction of a laser television according to an embodiment of the present invention. Referring to FIG. 1, a laser television 100 includes a plurality of lasers 111, 112, and 113 for generating different wavelengths of interferential light; a scanner 160 for displaying color images on a screen, the images being composed from the interferential light; a phase diffuser 180 positioned between the lasers 111, 112, and 113 and the scanner 160; a plurality of modulators 121, 122, and 123 for modulating the different wavelengths of light outputted from the lasers, respectively; a controller 130 for controlling the modulators 121, 122, and 123; and a lens system 150 for directing the light 111a, 112a, and 113a modulated by the modulators 121, 122, and 123, to the scanner 160.

The lasers 111, 112, and 113 include a first laser 111 for outputting first light 111a of green color having a wavelength range of 500-565 nm, a second laser 112 for outputting second light 112a of red color having a wavelength range of 630-780 nm, and a third laser 113 for outputting third light of blue color having a wavelength range of 435-500 nm. The first, second, and third light 111a, 112a, and 113a are synchronized and may be positioned in any order.

The phase diffuser 180, which is positioned between the lasers 111, 112, and 113 and the scanner 160, is a transmission-type device for diffusing the first, second, and third light 111a, 112a, and 113a, generated by the lasers 111, 112, and 113, according to the wavelength. The phase diffuser 180 has a waveguide layer, the slope of which varies continuously, the waveguide layer being formed on a substrate of quartz material.

The phase diffuser 180, outputs the first, second, and third light 111a, 112a, and 113a to the scanner 160, and can suppress the spatial speckle noise, which is caused by the high degree of interference of the first, second, and third light 111a, 112a, and 113a.

The phase diffuser 180 may refract the first, second, and third light 111a, 112a, and 113a with different angles according to the wavelength. In the present example, a dispersion phenomenon may occur according to the wavelength. However, the phase diffuser 180 can regulate the dispersion phenomenon according to the wavelengths of the first, second, and third light 111a, 112a, and 113a by slanting the boundary surface, through which the first, second, and third light 111a, 112a, and 113a are outputted to the scanner 160, at a predetermined angle.

In addition, it is possible to remove the time speckle noise by applying at least a predetermined number of vibrations to the phase diffuser 180.

Figure 2:
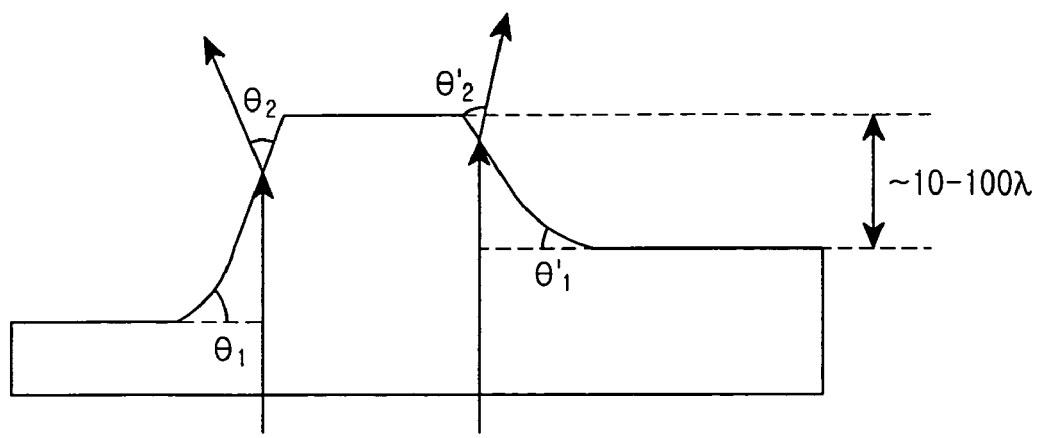
FIG. 2 is a diagram showing the structure of a phase diffuser depicted in FIG. 1.

FIG. 2 shows the structure of a phase diffuser 180 (FIG. 1). Referring to FIG. 2, the phase diffuser is formed of a medium, such as quartz, having a predetermined refraction index. The first, second, and third light 111a, 112a, and 113a (FIG. 1), which are incident $\theta_1$, $\theta'_1$ on the phase diffuser 180, are refracted with different angles $\theta_2$, $\theta_2$ according to the wavelength.

Figure 3:
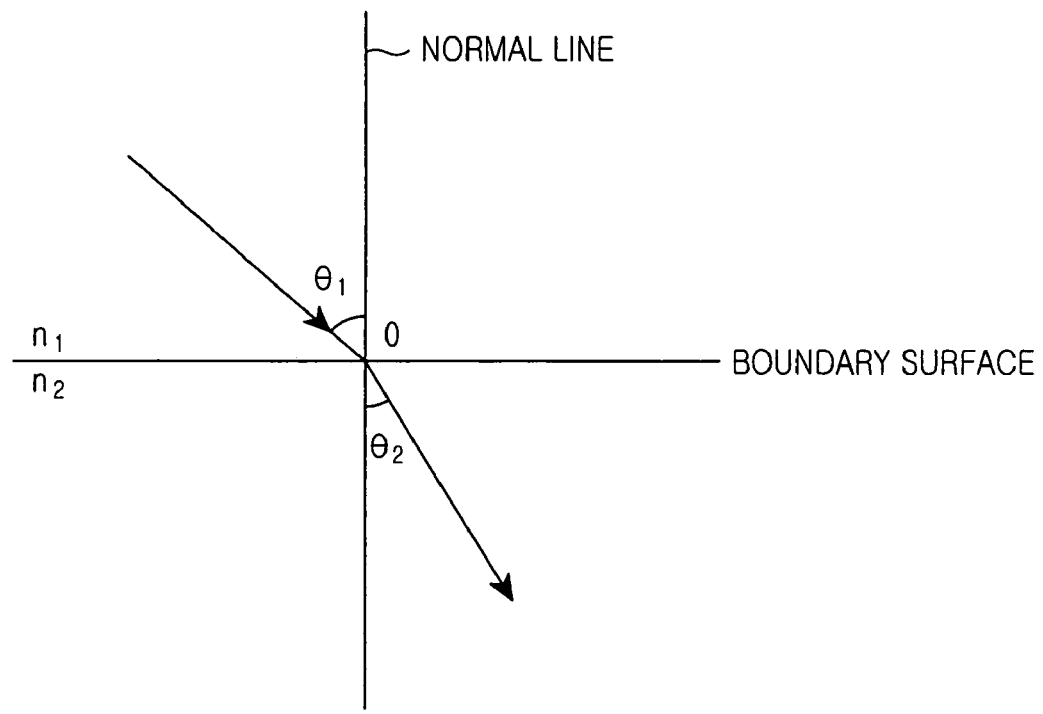
FIG. 3 is a graph illustrating the Snell's law.

FIG. 3 illustrates the Snell's law. Equation 1, given below, is a mathematical expression of the Snell's law, which explains the relationship among the refraction indices of media through which light propagates, and the incident angle $\theta_1$ and refraction angle $\theta_2$ of light, which is incident on the boundary between the media having different refraction indices. Equation 1 will now be explained with reference to FIG. 3. The boundary surface, which is positioned between first and second media, is the basis of incidence and refraction of light. The normal line is an axis perpendicular to the boundary surface, and the incident and refraction angles $\theta_1$, $\theta_2$ of light are calculated based on the normal line.

$$\frac{\sin \theta_1}{\sin \theta_2} = \frac{n_2}{n_1} \qquad \text{Equation 1}$$

In Equation 1, $n_1$ is the refraction index of a first medium through which light of a predetermined wavelength propagates; $n_2$ is the refraction index of a second medium on which light is incident from the first medium; $\theta_1$ is the incident angle of light, which is incident on the boundary surface, relative to the normal line; and $\theta_1$ is the refraction angle of light relative to the normal line and shows the degree of refraction the light experiences, due to the refraction index of the second medium when it is incident on the second medium.

From the Snell's law, which illustrates the propagation path of light when propagating through media of different refraction indices, it is clear that the light changes its propagation path according to the difference in refraction index between media. The refraction index of a medium is dependent on its wavelength, as expressed by a function of wavelength: $n=n(\lambda)$.

As a result, when the incident on the phase diffuser 180, light is diffused along different paths in accordance with the wavelength. This minimizes the spatial speckle noise on the screen. A chromatic dispersion phenomenon may occur due to the excessive refraction of light according to the wavelength. This, however, can be avoided by adjusting the refraction angle in the second medium, as indicated by Equation 1. In summary, the phase diffuser 180 (FIG. 1) has a surface, through which the first, second, and third light 111a, 112a, and 113a (FIG. 1) are outputted to the screen 170 (FIG. 1), slanted with a predetermined angle so that the chromatic aberration phenomenon, which is caused by the excessive diffusion of the first, second, and third light 111a, 112a, and 113a, can be avoided.

Figure 4:
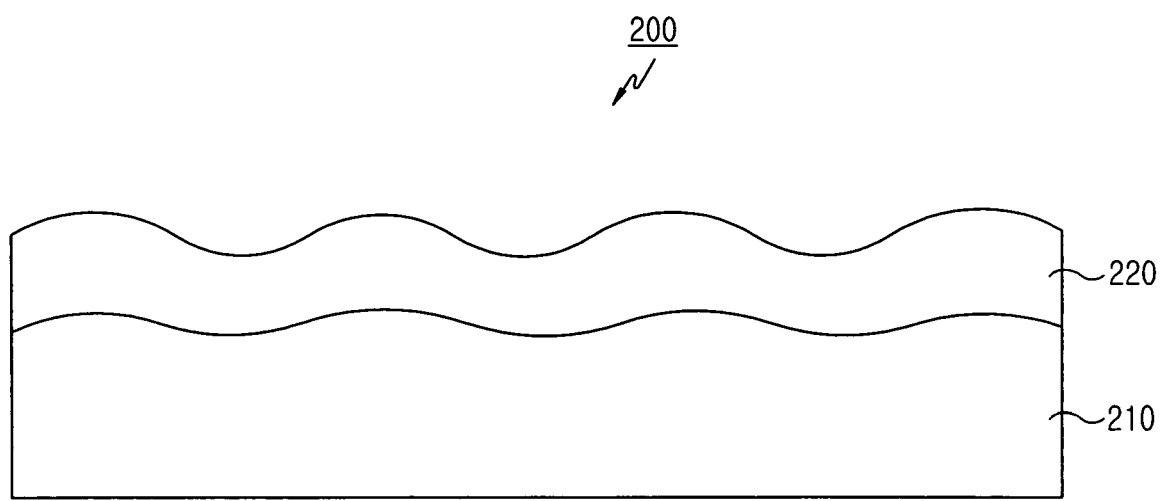
FIG. 4 is a diagram showing the structure of a phase diffuser according to a second embodiment of the present invention.

FIG. 4 shows the structure of a phase diffuser according to a second embodiment of the present invention. Referring to FIG. 4, the phase diffuser 200 has a waveguide layer 220, the slope of which varies continuously, formed on a substrate 210 of quartz material so that light is diffused according to the wavelength when it is incident on the waveguide layer 220 from the substrate 210. The variation in slope of the waveguide layer 220 makes it possible to suppress the chromatic dispersion phenomenon, i.e., the light is prevented from being excessively dispersed in accordance with the light's wavelength.

As mentioned above, the present invention provides a phase diffuser 200 and 180 (FIG. 1) capable of diffusing different wavelengths of light according to the wavelength and regulating the angle of diffused light, when it leaves the boundary surface, according to the angle of the boundary surface. This suppresses the dispersion phenomenon according to the wavelength. Consequently, the present invention is advantageous in that the speckle noise of different wavelengths of light can be suppressed with a single phase diffuser. This shortens the assembly process of laser televisions and reduces their manufacturing cost.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A laser television comprising:
    a plurality of lasers for generating wavelengths of light, each of the plurality of lasers generating a light having different wavelength;
    a scanner for displaying color images on a screen composed from the light generated by the plurality of lasers; and
    a phase diffuser positioned between the lasers and the scanner for diffusing the light from the plurality of lasers in accordance with the wavelength of the light, the phase diffuser having a boundary surface through which the light is outputted to the scanner, the boundary surface being slanted at a predetermined angle to regulate the range of diffraction of the light in accordance with the wavelength of the light.

2. The laser television as claimed in claim 1 further comprising:
    a plurality of modulators for modulating each of the different wavelengths of light outputted from the plurality of lasers;
    a controller for controlling the modulators; and
    a lens system for directing the modulated light into the scanner.

3. The laser television as claimed in claim 1, wherein the lasers include a first laser for outputting a first light of green color having a wavelength in the range of 500-565 nm.

4. The laser television as claimed in claim 3, wherein the lasers include a second laser for outputting a second light of red color having a wavelength in the range of 630-780 nm.

5. The laser television as claimed in claim 4, wherein the lasers include a third laser for outputting a third light of blue color having a wavelength in the range of 435-500 nm.

6. The laser television as claimed in claim 1, wherein the light is interferential light having a high coherency.

* * * * *